United States Patent
Qian

(10) Patent No.: US 11,881,018 B2
(45) Date of Patent: Jan. 23, 2024

(54) DETECTING DUAL BAND INFRARED LIGHT SOURCE FOR OBJECT TRACKING

(71) Applicant: HANGZHOU TARO POSITIONING TECHNOLOGY CO., LTD., Hangzhou (CN)

(72) Inventor: Hao Qian, Hangzhou (CN)

(73) Assignee: Hangzhou Taro Positioning Technology Co., Ltd., Hangzhou (CN)

( * ) Notice: Subject to any disclaimer, the term of this patent is extended or adjusted under 35 U.S.C. 154(b) by 442 days.

(21) Appl. No.: 17/259,131

(22) PCT Filed: Jul. 10, 2018

(86) PCT No.: PCT/CN2018/095208
§ 371 (c)(1),
(2) Date: Jan. 8, 2021

(87) PCT Pub. No.: WO2020/010532
PCT Pub. Date: Jan. 16, 2020

(65) Prior Publication Data
US 2021/0271878 A1    Sep. 2, 2021

(51) Int. Cl.
G06V 20/10    (2022.01)
G06V 10/10    (2022.01)
G06V 10/143   (2022.01)

(52) U.S. Cl.
CPC ............ *G06V 20/10* (2022.01); *G06V 10/143* (2022.01); *G06V 10/17* (2022.01)

(58) Field of Classification Search
CPC ....... G06V 20/10; G06V 10/143; G06V 10/17
See application file for complete search history.

(56) References Cited

U.S. PATENT DOCUMENTS

| 8,022,997 B2 * | 9/2011 | Shingu | G06V 10/17 |
| | | | 434/428 |
| 2011/0043689 A1 * | 2/2011 | Cobb | H04N 5/147 |
| | | | 348/E7.003 |

(Continued)

FOREIGN PATENT DOCUMENTS

| CN | 103562933 A | 2/2014 |
| CN | 103632340 A | 3/2014 |

(Continued)

OTHER PUBLICATIONS

International Search Report issued in International Application No. PCT/CN2018/095208 dated Apr. 12, 2019 (4 pages).

(Continued)

*Primary Examiner* — Santiago Garcia
(74) *Attorney, Agent, or Firm* — Osha Bergman Watanabe & Burton LLP

(57) ABSTRACT

A method for object tracking. The method includes capturing, using an optical sensor having first and second sensing matrices, an image of a scene (211), analyzing a first pixel of the image to detect imbalanced pixel sensing values from the first and second sensing matrices (212), analyzing a second pixel of the image to detect balanced pixel sensing values from the first and second sensing matrices (213), comparing the imbalanced pixel sensing values and the balanced pixel sensing values to generate a result (214), and determining, based on the result, that a first portion of the scene associated with the first pixel corresponds to a background of the scene, and that a second portion of the scene associated with the second pixel corresponds to a predetermined light source (215).

20 Claims, 13 Drawing Sheets

(56) References Cited

U.S. PATENT DOCUMENTS

| | | | |
|---|---|---|---|
| 2011/0081043 A1* | 4/2011 | Sabol | G06T 7/254 |
| | | | 382/103 |
| 2012/0307034 A1* | 12/2012 | Sekine | G06V 10/141 |
| | | | 382/190 |
| 2013/0034266 A1* | 2/2013 | Shamir | G06F 18/256 |
| | | | 382/103 |
| 2014/0028861 A1* | 1/2014 | Holz | G06V 10/143 |
| | | | 348/208.4 |
| 2019/0012540 A1* | 1/2019 | Trail | H04N 23/11 |
| 2019/0243369 A1* | 8/2019 | Wang | G01S 17/46 |

FOREIGN PATENT DOCUMENTS

| | | |
|---|---|---|
| CN | 104754237 A | 7/2015 |
| EP | 3035242 A1 | 6/2016 |

OTHER PUBLICATIONS

Written Opinion issued in International Application No. PCT/CN2018/095208 dated Apr. 12, 2019 (3 pages).

\* cited by examiner

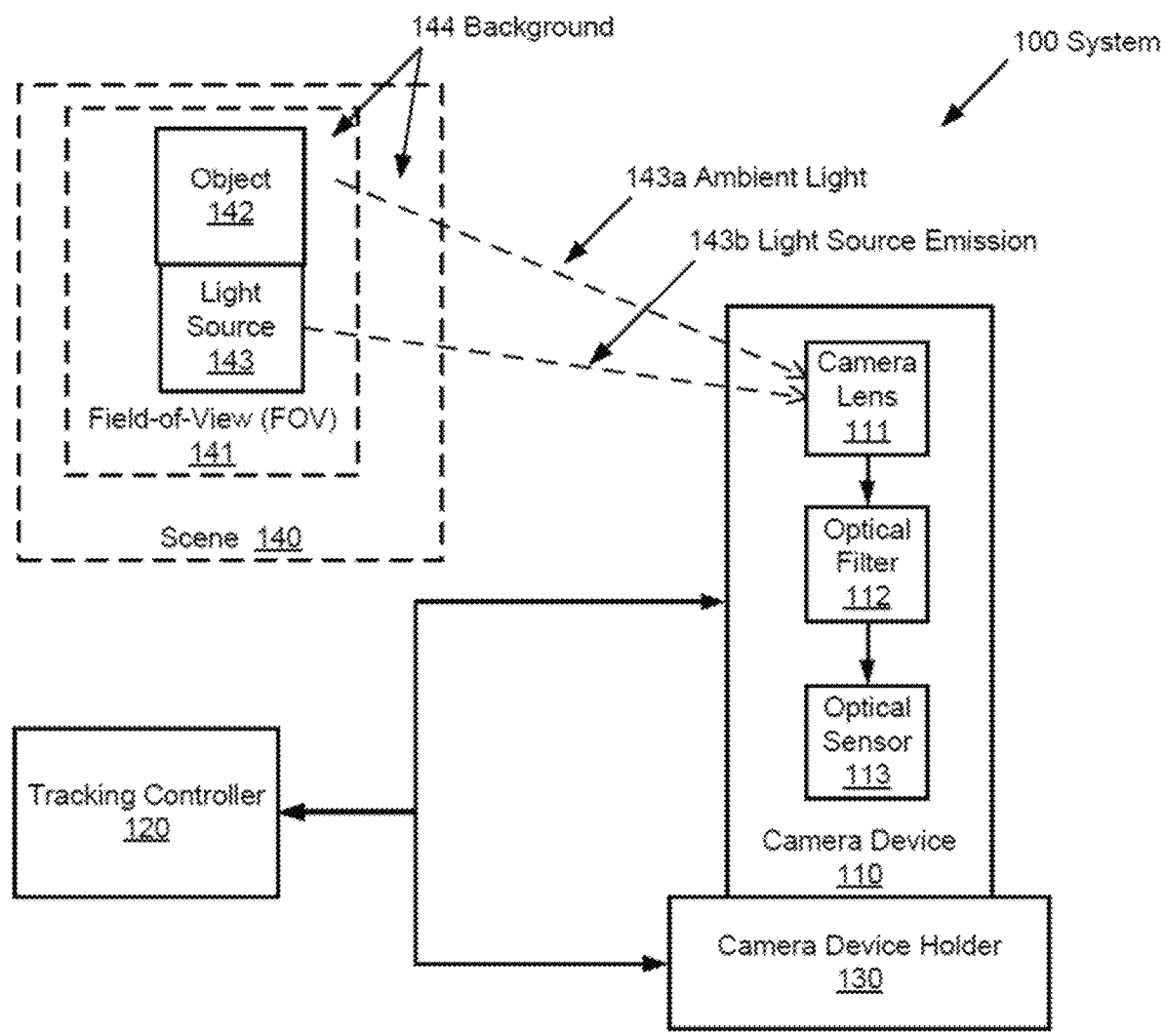
FIG. 1.1

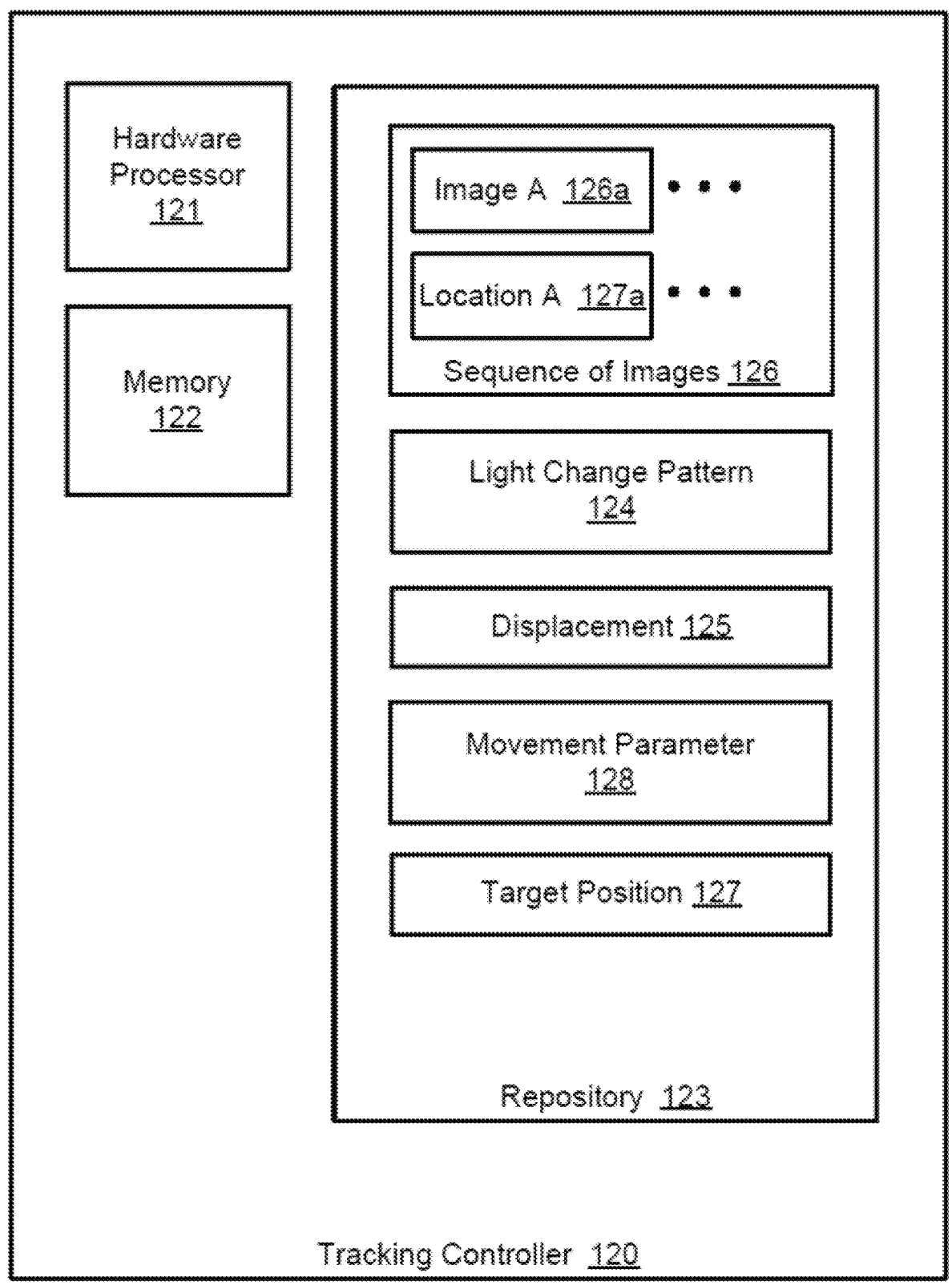
FIG. 1.2

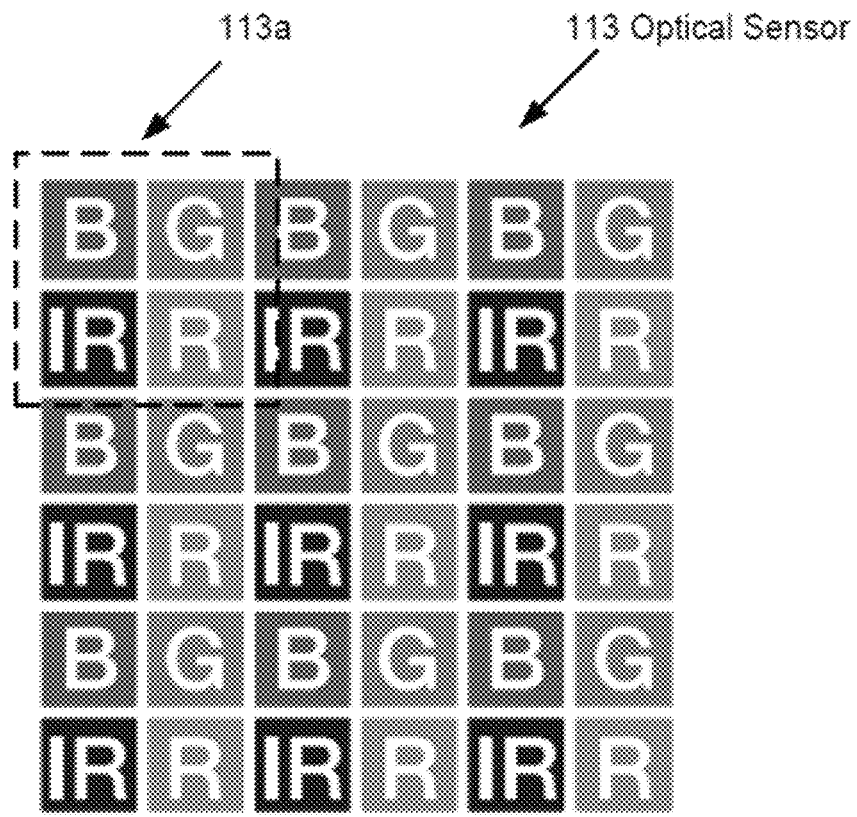
FIG. 1.3
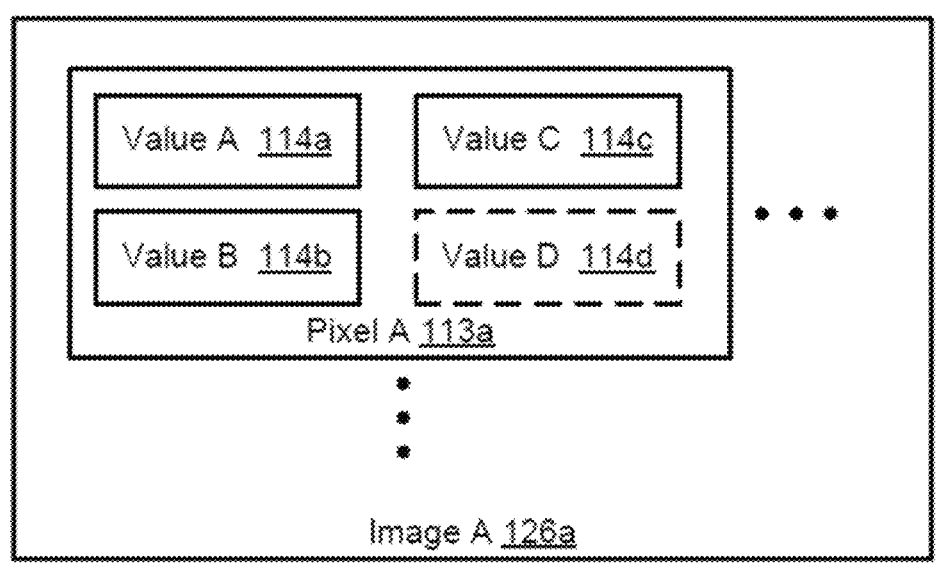
FIG. 1.4

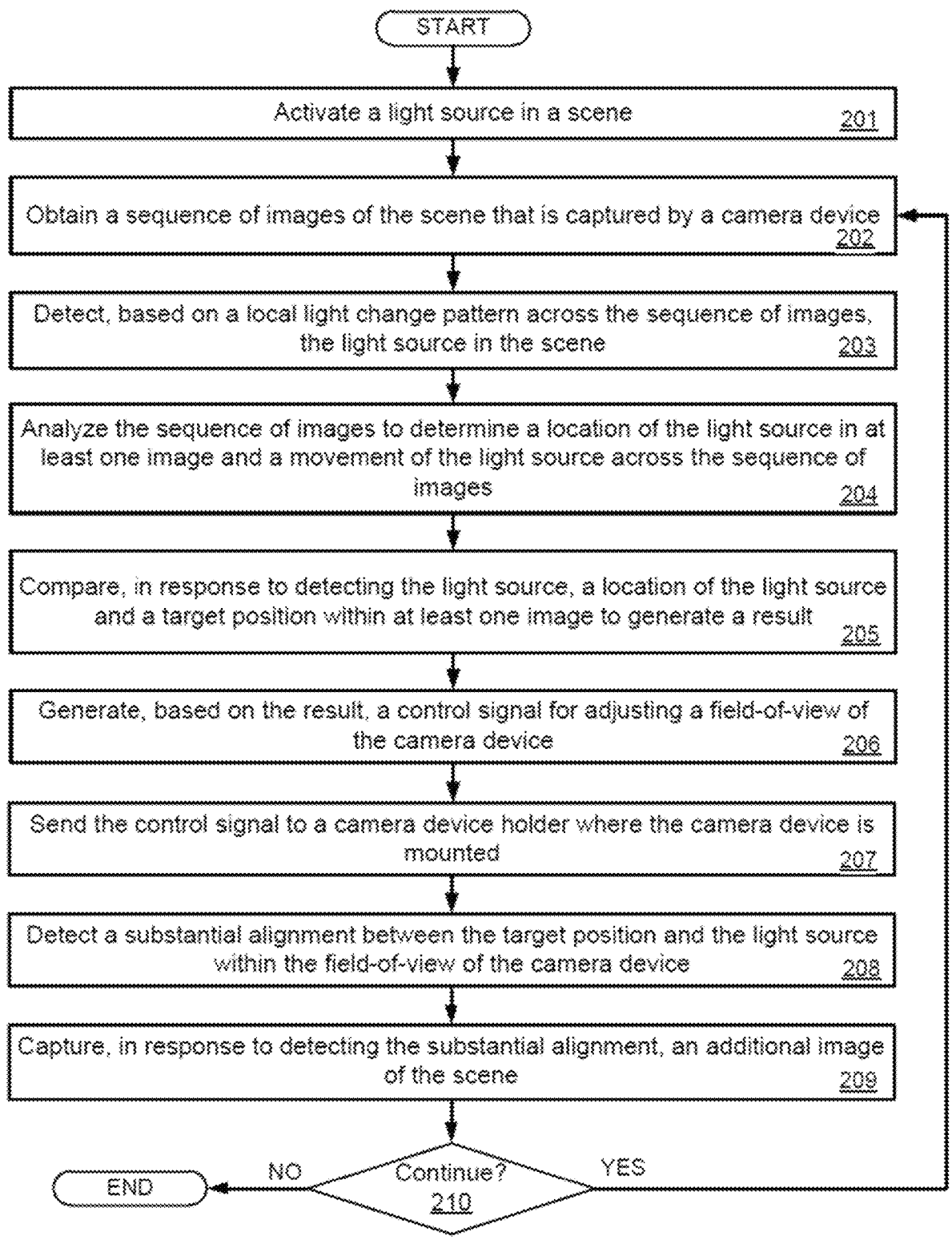
FIG. 2.1

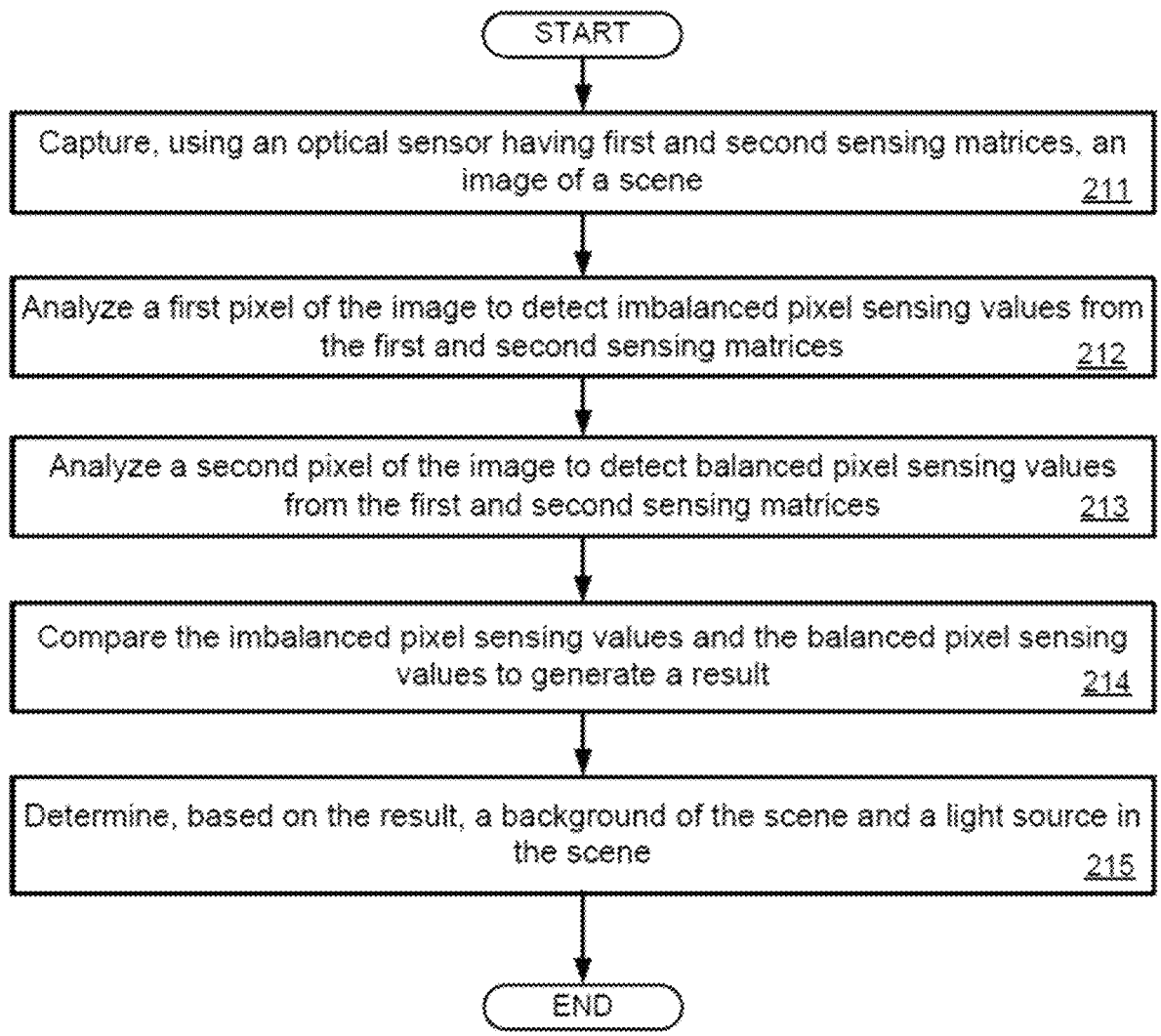
FIG. 2.2

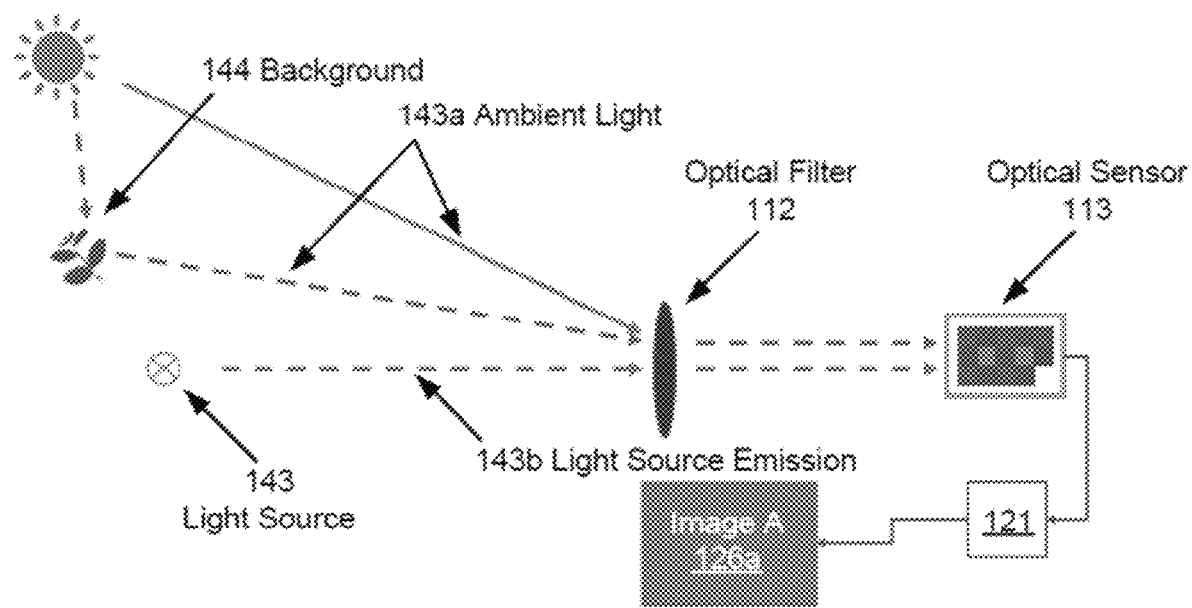
FIG. 3.1

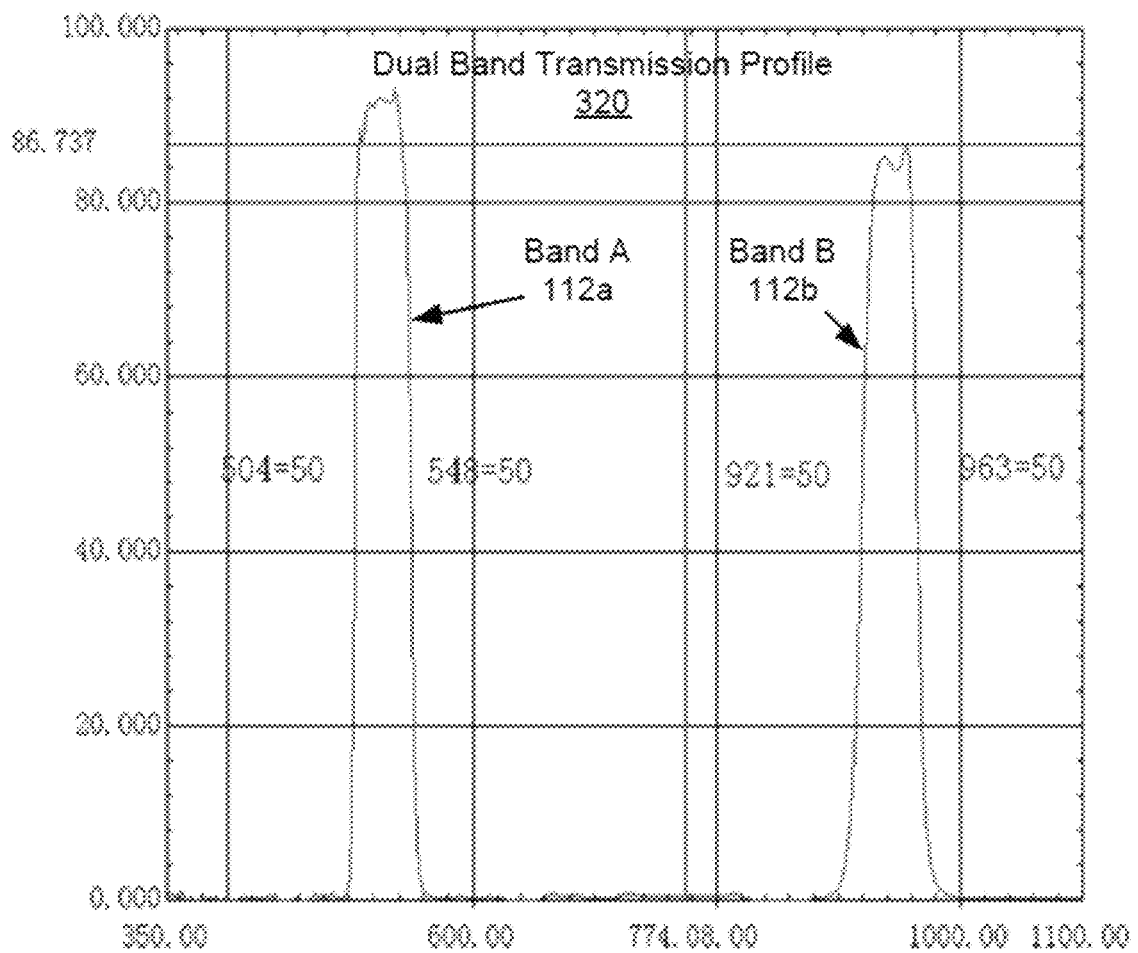
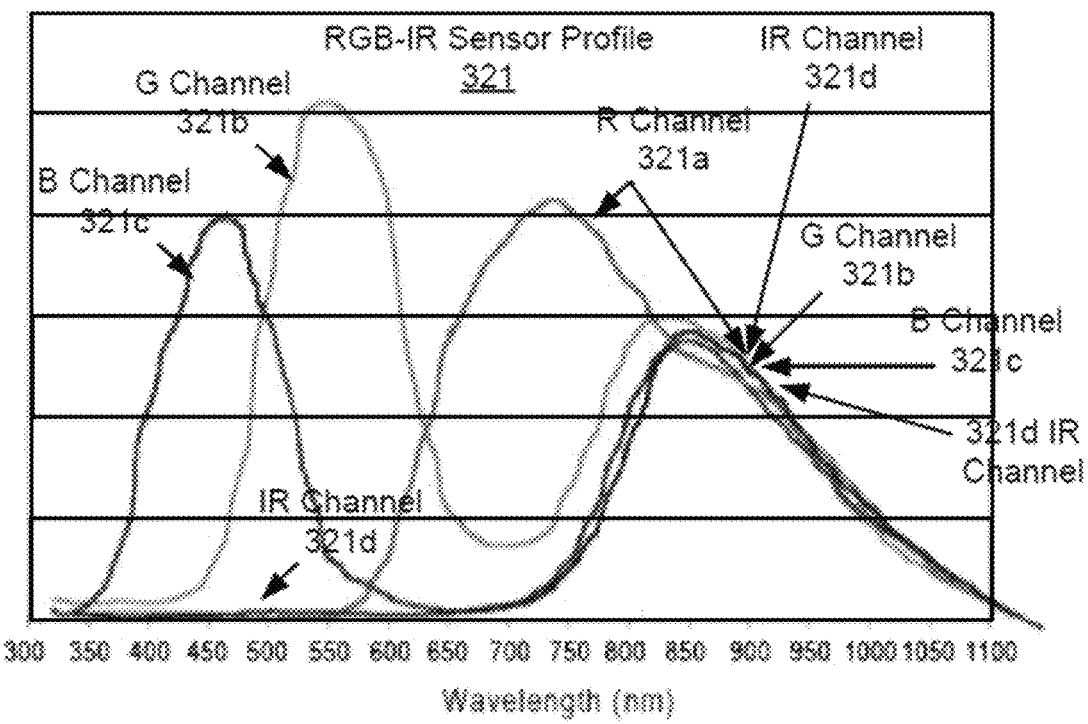
FIG. 3.2

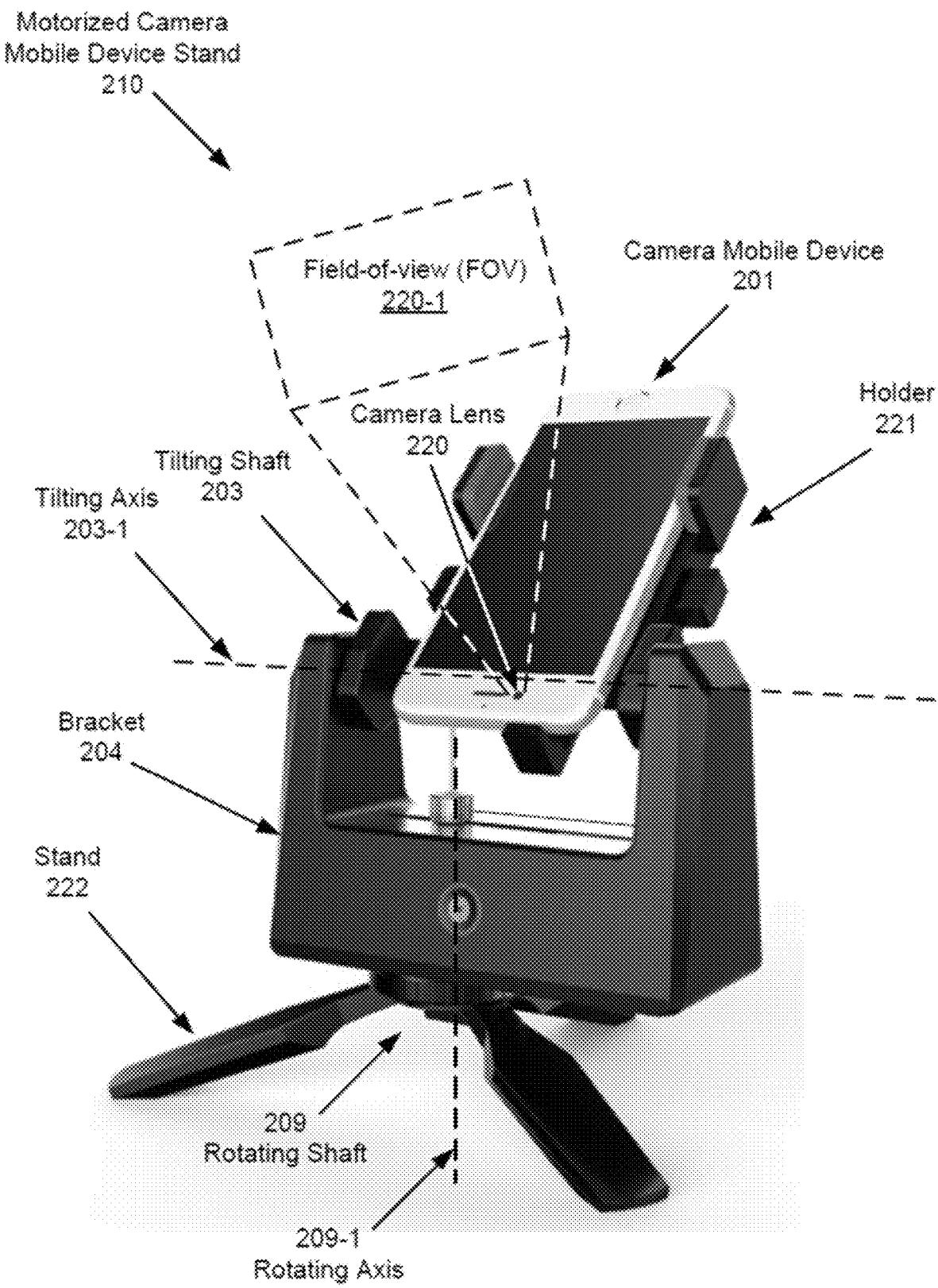
FIG. 3.3

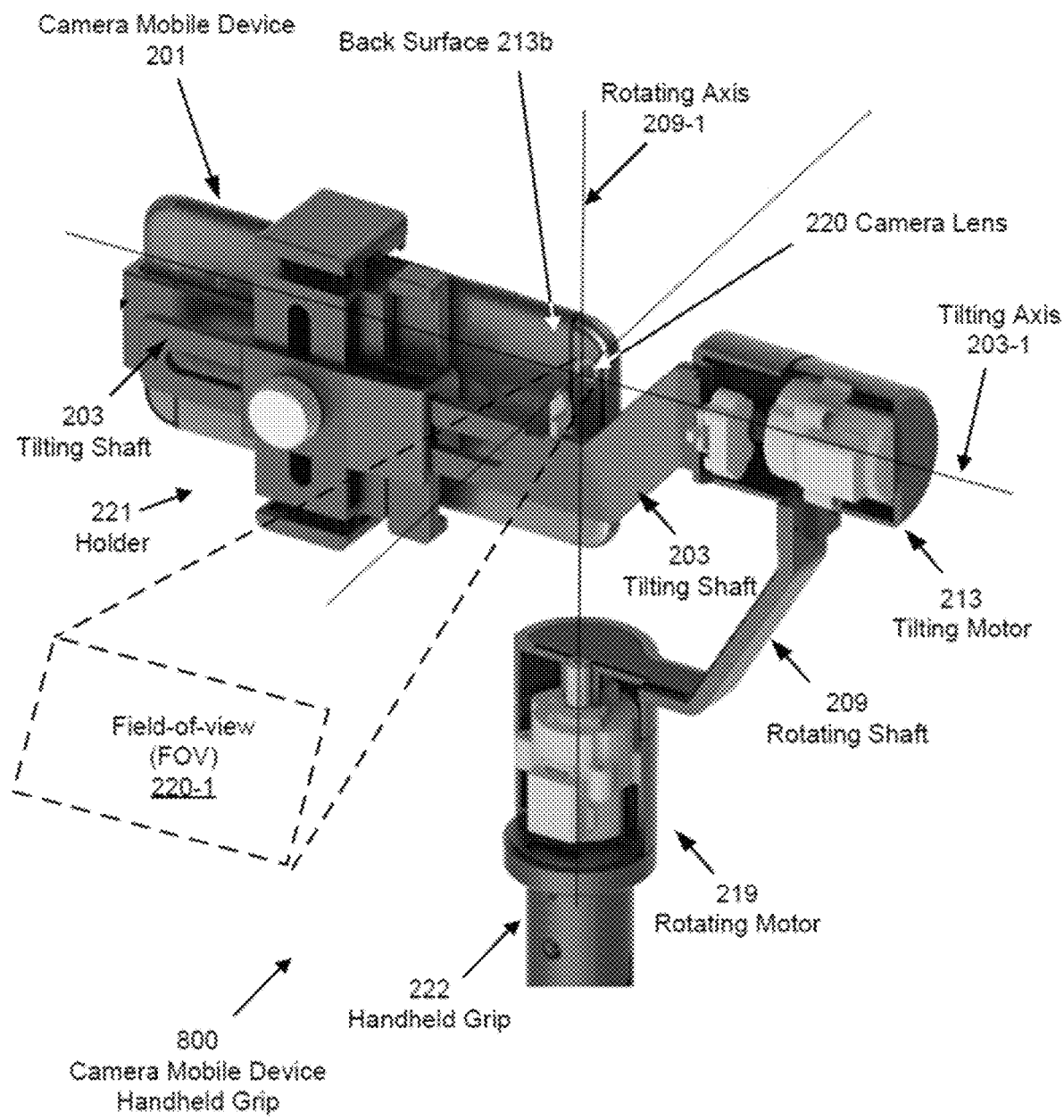
*FIG. 3.4*

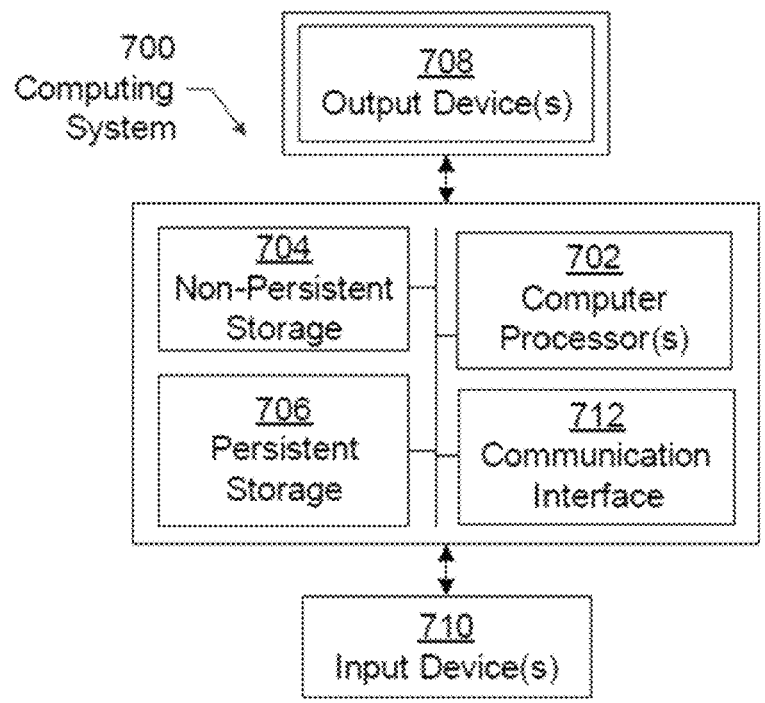
*FIG. 7.1*
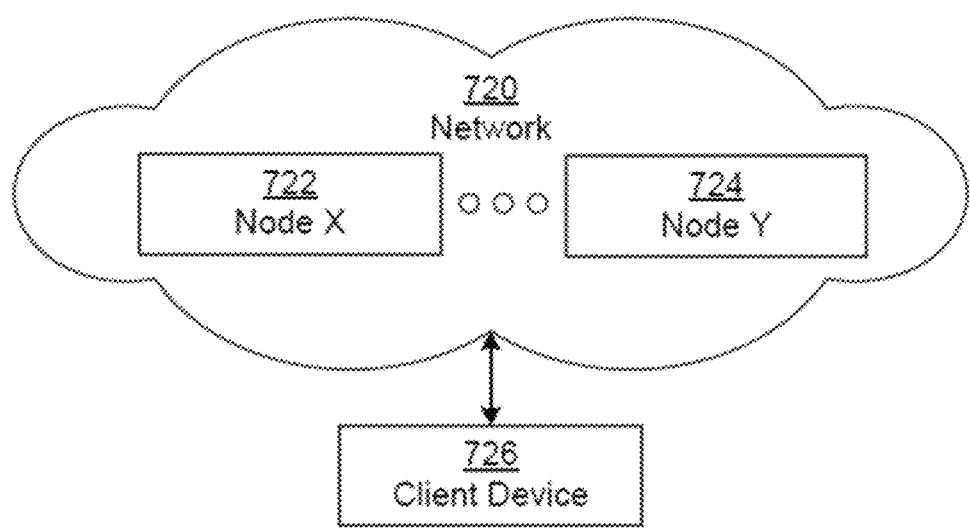
*FIG. 7.2*

DETECTING DUAL BAND INFRARED LIGHT SOURCE FOR OBJECT TRACKING

BACKGROUND

A field-of-view (FOV) is an extent of a scene that is imaged by a camera. An object inside the FOV will appear in an image captured and/or outputted by the camera. For example, the FOV may correspond to a solid angle within which a camera lens projects light input to an optical sensor of the camera.

SUMMARY

In general, in one aspect, the invention relates to a method for object tracking. The method includes capturing, using an optical sensor comprising first and second sensing matrices, an image of a scene, analyzing a first pixel of the image to detect imbalanced pixel sensing values from the first and second sensing matrices, analyzing a second pixel of the image to detect balanced pixel sensing values from the first and second sensing matrices, comparing the imbalanced pixel sensing values and the balanced pixel sensing values to generate a result, and determining, based on the result, that a first portion of the scene associated with the first pixel corresponds to a background of the scene, and that a second portion of the scene associated with the second pixel corresponds to a pre-determined light source.

In general, in one aspect, the invention relates to a tracking controller. The tracking controller includes a computer processor, and memory storing instructions, when executed, causing the computer processor to obtain, from an optical sensor comprising first and second sensing matrices, an image of a scene, analyze a first pixel of the image to detect imbalanced pixel sensing values from the first and second sensing matrices, analyze a second pixel of the image to detect balanced pixel sensing values from the first and second sensing matrices, compare the imbalanced pixel sensing values and the balanced pixel sensing values to generate a result, and determine, based on the result, that a first portion of the scene associated with the first pixel corresponds to a background of the scene, and that a second portion of the scene associated with the second pixel corresponds to a pre-determined light source.

In general, in one aspect, the invention relates to a non-transitory computer readable medium storing instructions for object tracking. The instructions, when executed by a computer processor, include functionality for obtaining, from an optical sensor comprising first and second sensing matrices, an image of a scene, analyzing a first pixel of the image to detect imbalanced pixel sensing values from the first and second sensing matrices, analyzing a second pixel of the image to detect balanced pixel sensing values from the first and second sensing matrices, comparing the imbalanced pixel sensing values and the balanced pixel sensing values to generate a result, and determining, based on the result, that a first portion of the scene associated with the first pixel corresponds to a background of the scene, and that a second portion of the scene associated with the second pixel corresponds to a pre-determined light source.

Other aspects of the invention will be apparent from the following description and the appended claims.

BRIEF DESCRIPTION OF DRAWINGS

FIGS. 1.1, 1.2, 1.3, and 1.4 show schematic block diagrams of a system in accordance with one or more embodiments of the invention.

FIGS. 2.1 and 2.2 show method flowcharts in accordance with one or more embodiments of the invention.

FIGS. 3.1, 3.2, 3.3, 3.4, 4, 5, and 6 show various examples in accordance with one or more embodiments of the invention.

FIGS. 7.1 and 7.2 show a computing system in accordance with one or more embodiments of the invention.

DETAILED DESCRIPTION

Figure 4:
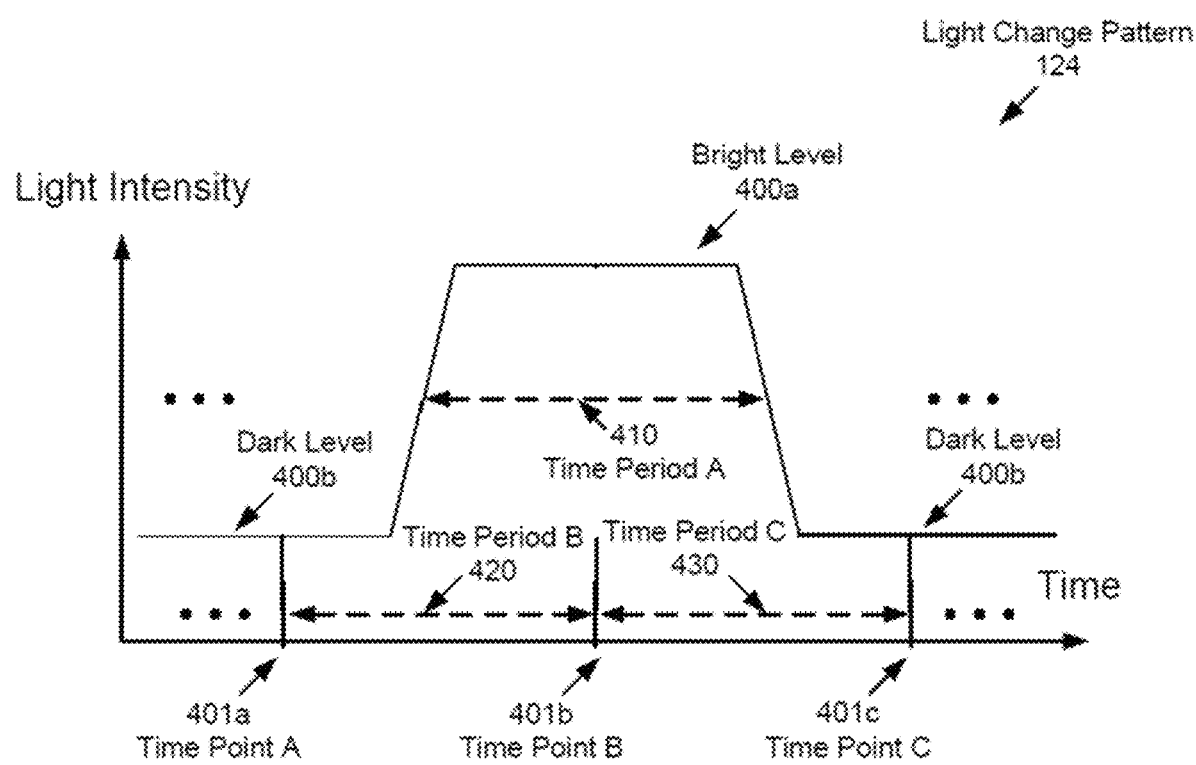

Specific embodiments of the invention will now be described in detail with reference to the accompanying figures. Like elements in the various figures may be denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description, any component described with regard to a figure, in various embodiments of the invention, may be equivalent to one or more like-named components described with regard to any other figure. For brevity, at least a portion of these components are implicitly identified based on various legends. Further, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure. In the figures, black solid collinear dots indicate that additional components similar to the components before and/or after the solid collinear dots may optionally exist. Further, a solid line or a dash line connecting the components of a figure represent a relationship between the connected components. The dash line indicates that the relationship may not include or otherwise associate with any physical connection or physical element.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide a system, a method, and a computer readable medium for tracking an object in a field-of-view (FOV) of a camera device. In one or more embodiments of the invention, a light source is attached to the object while a sequence of images are captured using the camera device. In one or more embodiments, the light source emits a strobe light that changes light intensity and/or color (i.e., wavelength) from time to time. Based on a pattern of local light change across the sequence of images, the light source is detected in the FOV. In response to detecting the light source, a location of the light source and a target position within an image are compared to generate a result, such as a displacement or a movement parameter. Accordingly, a control signal is generated based on the result to control a camera device holder. Specifically, the camera device holder adjusts the FOV based on the control signal such that the light source substantially aligns with the target position within the FOV. In one or more embodiments, the sequence of images is part of a video recording and the control signal causes the object to appear at the target position within the FOV in the video recording.

Embodiments of the invention use a light source with invisible light (e.g., infrared (IR) light) to prevent the light source becoming visible in the captured image or recorded video. Interference from ambient light (e.g., outdoor sunlight) in the background is mitigated by taking advantage of differences in pixel sensing values of IR and visible channels of an optical sensor. The captured image is analyzed to identify the light source against the background based on pixels having respective pre-determined balance profiles of pixel sensing values. Accordingly, the object may be tracked in the FOV as described above.

FIG. 1.1 shows a system (100) in accordance with one or more embodiments. In one or more embodiments, one or more of the modules and elements shown in FIG. 1.1 may be omitted, repeated, and/or substituted. Accordingly, embodiments of the invention should not be considered limited to the specific arrangements of modules shown in FIG. 1.1.

As shown in FIG. 1.1, the system (100) includes a camera device (110) having a camera lens (111) with associated image capturing components, a tracking controller (120), a camera device holder (130), a scene (140), a field-of-view (FOV) (141) of the camera lens (111), an object (142) appearing within the FOV (141), and a light source (143) attached to the object (142). Further, the camera device (110), tracking controller (120), and camera device holder (130) are communicatively coupled to each other. In one or more embodiments of the invention, two or more of the camera device (110), tracking controller (120), and camera device holder (130) are integrated into a single device. For example, at least a portion of the tracking controller (120) may be included in the camera device (110). In another example, at least a portion of the tracking controller (120) may be included in the camera device holder (130). In still another example, one part of the tracking controller (120) is included in the camera device (110) while another part of the tracking controller (120) is included in the camera device holder (130).

In one or more embodiments of the invention, the light source (143) is any device or element that emits light. In one or more embodiments, the light source (143) includes a light-emitting-diode (LED). In one or more embodiments, the light source (143) emits a strobe light, which changes intensity and/or color (i.e., wavelength) from time to time. For example, the strobe light may emit a free-running light change pattern according to a particular duty cycle (i.e., a percentage of time when the light pattern has a bright level or a particular color/wavelength) and repetition rate (i.e., a number of time the intensity changes during a unit time period). As used herein, light change pattern is a pattern of intensity and/or color/wavelength change in the light. In one or more embodiments, the light source (143) emits a light change pattern with a low repetition rate (e.g., 10 hertz, 20 hertz, etc.) comparing to a frame rate of the camera device (110). The frame rate is a number of images (e.g., a burst of still images or a video recording) captured by the camera device (110) during a unit time. In one or more embodiments, the light source (143) emits a light change pattern that is synchronized with the frame rate of the camera device (110).

In one or more embodiments of the invention, the camera device (110) is a device with a camera lens (e.g., camera lens (111)) and associated components (e.g., optical filter (112), optical sensor (113)) for taking photographs and/or video recordings. For example, the optical filter (112) may selectively transmit light of certain wavelength. The camera lens (111) and optical filter (112) may be integrated together or separate from each other in the camera device (110). The optical sensor (113) may be a complementary metal oxide semiconductor (CMOS) sensor described in reference to FIG. 1.3 below. In one or more embodiments, the optical sensor (113) is an RGB CMOS sensor and the optical filter (112) has a visible band and an IR band transmission profile. An example of such embodiments is described in reference to FIGS. 3.1 and 3.2 below. In one or more embodiments, the optical sensor (113) is an RGB-IR CMOS sensor and the optical filter (112) is omitted (i.e., eliminated or otherwise not used) in the camera device (110). An example of such embodiments is described in reference to FIGS. 3.1 and 3.2 below.

A dedicated camera with communication capability is an example of the camera device (110). In one or more embodiments, the camera device (110) is a mobile device, such as a mobile phone with a built-in camera, referred to as a smart phone. A smart phone may have a display with graphical user interface that occupy a large portion (e.g., 70% or larger) of the front surface. The camera lens (111) may be on the front surface or back surface (i.e., opposite to the front surface) of the smart phone. In one or more embodiments, the camera device (110) includes a timer to control the frame rate of image capture based on the duty cycle and/or repetition rate of the light source (143).

In one or more embodiments, the scene (140) is a place where an action or event, imaged by the camera device (110), occurs. The action or event is typically associated with an object of interest, such as the object (142). In this context, the remaining extent of the scene (140), separate from the object (142), is referred to as the background (144). In other words, other objects and/or elements in the scene (140) are of less or no interest as compared to the object (142) in the context of object tracking. Both the object (142) with the light source (143), and the background (144) are captured by the camera device (110) into images. More specifically, the ambient light (143a) emitted from the background (144) and the light source emission (143b) emitted from the light source (143) are captured and directed by the camera lens (111) onto the optical sensor (113) to form images.

The field-of-view (FOV) (141) is an extent of the scene (140) that is imaged by the camera device (110) using the camera lens (111). In other words, an object inside the FOV (141) will appear in an image captured and/or outputted by the camera device (110). For example, the FOV (141) may correspond to a solid angle within which the camera lens (111) projects light input to the associated optical sensor (113) of the camera device (110). In one or more embodiments, the FOV (141) corresponds to different portions of the scene (140) according to how the camera lens (111) is oriented toward, zoomed with respect to, or otherwise positioned relative to, the scene (140). In one or more embodiments, the camera device (110) includes a hardware component, a software component, or a combination thereof. In one or more embodiments, the camera device (110) may include, or otherwise be implemented using, at least a portion of the computing system (700) and network (720) described in reference to FIGS. 7.1 and 7.2 below.

In one or more embodiments of the invention, the camera device holder (130) is configured to mechanically hold the camera device (110) and to adjust, in response to a control signal from the tracking controller (120), the FOV (141) of the camera lens (111). For example, the camera device holder (130) may include a motorized tilt and swivel device for adjusting a camera angle of the camera lens (111). In another example, the camera device holder (130) may include a motorized horizontal and vertical sliding device for adjusting a position of the camera lens (111) relative to the scene (140). The sliding device may include a mechanical stage for holding and moving the camera device (110). Examples of the camera device holder (130) are described in reference to FIGS. 3.3 and 3.4 below.

In one or more embodiments, the tracking controller (120) includes a hardware component, a software component, or a combination thereof that is configured to adjust the FOV (141) of the camera lens (111). For example, the tracking controller (120) may control the FOV (141) by way of controlling the camera device holder (130). In another example, the tracking controller (120) may further control the FOV (141) by way of controlling a zoom level of the camera lens (111). In one or more embodiments, the tracking controller (120) controls the FOV (141) such that the object (142) appears in a target position within the FOV (141). In one or more embodiments, the tracking controller (120) controls the FOV (141) using the method described in reference to FIGS. 2.1 and/or 2.2 below. In one or more embodiments, the tracking controller (120) includes the components described in reference to FIG. 1.2 below.

FIG. 1.2 shows details of the tracking controller (120) in accordance with one or more embodiments. The following description of FIG. 1.2 refers to various components depicted in FIG. 1.1 above. In one or more embodiments, one or more of the modules and elements shown in FIG. 1.2 may be omitted, repeated, and/or substituted. Accordingly, embodiments of the invention should not be considered limited to the specific arrangements of modules shown in FIG. 1.2.

As shown in FIG. 1.2, the tracking controller (120) includes a hardware processor (121), memory (122), and repository (123). In one or more embodiments of the invention, the hardware processor (121) corresponds to the computer processors (702) depicted in FIG. 7.1 below. Similarly, the memory (122) and repository (123) correspond to the non-persistent storage (704) and/or persistent storage (706) depicted in FIG. 7.1 below. For example, the memory (122) may store software instructions that, when executed, cause the hardware processor (121) to perform FOV adjustment or other tracking functionalities of the camera device (110) depicted in FIG. 1.1 above. In one or more embodiments, the tracking controller (120) performs the FOV adjustment or other tracking functionalities according to the method flowchart described in reference to FIGS. 2.1 and 2.2 below. In one or more embodiments, the memory (122) stores instructions to perform one or more portions of the method flowcharts described in reference to FIGS. 2.1 and 2,2 below. In one or more embodiments, the tracking controller (120) and the camera device (110) are integrated into a single device. In such embodiments, the instructions to perform one or more portions of the method flowcharts described in reference to FIGS. 2.1 and 2,2 are part of a mobile application, or mobile app, which is a user-installable software application designed to run on a smart phone or other mobile devices.

Further as shown in FIG. 1.2, the repository (123) includes a sequence of images (126), an light change pattern (124), a displacement (125), a movement parameter (128), and a target position (127). In particular, the sequence of images (126) includes consecutive images (e.g., image A (126a)) captured by the camera device (110). For example, the image A (126a) corresponds to a portion of the scene (140) that is covered by the FOV (141) at a particular time point. The light change pattern (124) is a pattern of light intensity and/or color/wavelength alternating between different intensity levels and/or colors/wavelengths across the sequence of images (126). In one or more embodiments, the light change pattern (124) corresponds to a spot in each image of the sequence of images (126). For example, the spot may be defined by a pixel position or a collection of connected pixel positions in each image. In one or more embodiments, the light change pattern (124) is caused by a strobe light emitted from the light source (143) and indicates a location of the light source (143) within each image. In other words, the location of the light source (143) within each image may be determined based on where the light change pattern (124) is found across the sequence of images (126). For example, the light change pattern (124) indicates that the light source (143) is at the location A (127a) in the image A (126a). Similarly, each other image in the sequence of images (126) is associated with a location of the light source (143). The target position (127) is a pre-determined position that the tracking controller (120) is configured for tracking the object (142). For example, the target position (127) may be defined as the center of the FOV (141), which corresponds to the center of each image of the sequence of images (126). In other words, the tracking controller (120) is configured to adjust the FOV (141) such that the object (142) appears at the center (i.e., target position (127)) in the image after the adjustment. In other examples, the target position (127) may be defined as different positions from the center of the FOV (141). The displacement (125) is the distance between the target position (127) and the location (e.g., location A (127a)) of the light source (143) within an image. In one or more embodiments, the displacement (125) includes a horizontal distance and a vertical distance that are represented based on a number of pixels or any other suitable distance scale. In one or more embodiments, the object (142) may be a moving object such that the location (e.g., location A (127a)) of the light source (143) may vary from one image to next in the sequence of images (126). In such embodiments, the movement parameter (128) is a rate of change of the location (e.g., location A (127a)) of the light source (143) over time. For example, the movement parameter (128) may include a change in the location (e.g., location A (127a)) of the light source (143) from one image to next in the sequence of images (126). Depending on the moving direction of the object (142), the movement parameter (128) may include a horizontal portion and a vertical portion. Mathematically, the movement parameter (128) corresponds to a derivative of the displacement (125) over time.

In one or more embodiments, the tracking controller (120) performs the FOV adjustment or other tracking functionalities based on the sequence of images (126), light change pattern (124), displacement (125), movement parameter (128), and target position (127) described above. Specifically, the tracking controller (120) performs the FOV adjustment or other tracking functionalities using the method described in reference to FIGS. 2.1 and 2.2 below. An example of detecting the light change pattern (124) under ambient light interference is described in reference to FIGS. 3.1 and 3.2 below. An example of using the sequence of images (126) and light change pattern (124) to extract the displacement (125) and movement parameter (128) is described in reference to FIGS. 4-6 below.

FIG. 1.3 shows example details of the optical sensor (113) depicted in FIG. 1.1 above. In particular, FIG. 1.3 shows an example of an RGB-IR sensor, which includes an array of CMOS sensing elements arranged in a repetitive pattern. Each pixel sensing element (e.g., pixel sensing element (113*a***)) of the RGB-IR sensor includes a set of adjacent sensing elements labeled "R", "G", "B", and "IR", respectively. Sensing elements labeled "R" are sensitive to red wavelength range and generate pixel sensing values for each pixel that are referred to as the R channel. Sensing elements labeled "G" are sensitive to green wavelength range and generate pixel sensing values for each pixel that are referred to as the G channel. Sensing elements labeled "B" are sensitive to blue wavelength range and generate pixel sensing values for each pixel that are referred to as the B channel. Sensing elements labeled "IR" are sensitive to infrared wavelength range and generate pixel sensing values for each pixel that are referred to as the IR channel.

Although not explicitly shown, sensing elements labeled "IR" may be omitted from FIG. 1.3 to represent an RGB sensor. In particular, the RGB sensor generates pixel sensing values for the R, G, and B channels with no IR channel.

FIG. 1.4 shows example details of the image A (126*a*) depicted in FIG. 1.2 above. For example, the image A (126*a*) shown in FIG. 1.4 may be generated by the RGB-IR sensor or RGB sensor described in FIG. 1.3 above. As shown in FIG. 1.4, the image A (126) includes rows and columns of pixels, such as pixel A (113*a*) that may be generated by the sensing element (113*a*). The pixel A (113*a*) includes pixel sensing values of the aforementioned R, G, B, and IR channels. For example, the value A (114*a*), value B (114*b*), value C (114*c*), and value D (114*d*) may correspond to the pixel sensing values of the R, G, B, and IR channels, respectively. If the pixel A (113*a*) has two or more pixel sensing values that are substantially similar (i.e., with difference less than 5% or other predefined percentage) to each other, the pixel A (113*a*) is referred to as having a balanced pixel sensing values among the particular two or more pixel sensing values. If the pixel A (113*a*) has two or more pixel sensing values that are substantially different (i.e., with difference exceeding 5% or other predefined percentage) from each other, the pixel A (113*a*) is referred to as having an imbalanced pixel sensing values among the particular two or more pixel sensing values.

While FIGS. 1.3 and 1.4 relate to the RGB-IR sensor, the sensing elements labeled "IR" and the value D (114*d*) may be omitted from the optical sensor (113) and the image A (126*a*) to represent an example RGB sensor.

Based on the example RGB sensor and corresponding captured image described in reference to FIGS. 1.3 and 1.4 above, a bimodal filter may be used to filter out most of the light that adversely affects the identification of infrared light sources, leaving only the infrared portion of a particular wavelength band, and the visible portion of a green or blue wavelength band. From the light entering through the camera lens, only the light emitted by the infrared light source, and the filtered visible light (green or blue) reaches the RGB sensor to generate pixel sensing values. A differential algorithm is used to distinguish the IR light source from the ambient light produced by solar light scattering. Because of the photo-sensitive response of the R, G, and B channels to IR wavelength range, a white pixel having R/G/B sensing values with similar and sufficient brightness (i.e., balanced pixel sensing values) indicates light emitted from the IR light source. In contrast, a green or blue pixel having sufficient green or blue pixel sensing value (i.e., imbalanced pixel sensing values) indicates visible ambient light from the background. With this algorithm, visible ambient light and the IR light source are separated in the captured image A (126*a*). Further details are described in reference to FIGS. 3.1 and 3.2 below.

Based on the example RGB-IR sensor and corresponding captured image described in reference to FIGS. 1.3 and 1.4 above, the pixel sensing values of visible ambient light in the R, G, and B channels are relatively higher than the IR channel. In other words, pixel sensing value differences between the IR channel and any one of the R, G, and B channel (i.e., imbalanced pixel sensing values) indicate the ambient light from the background. In contrast, the pixel sensing values of the IR light source in the R, G, and B channels are similar to the IR channel. In other words, similar pixel sensing values between the IR channel and any one of the R, G, and B channel (i.e., imbalanced pixel sensing values) indicate the light source emission from the IR light source. According to this heuristic rule, the visible ambient light and the IR light source are separated in the captured image A (126*a*). Further details are described in reference to FIGS. 3.1 and 3.2 below.

FIGS. 2.1 and 2.2 show flowcharts in accordance with one or more embodiments. The process shown in FIGS. 2.1 and 2.2 may be executed, for example, by one or more components discussed above in reference to FIGS. 1.1-1.4. One or more steps shown in FIGS. 2.1 and 2.2 may be omitted, repeated, and/or performed in a different order among different embodiments of the invention. Accordingly, embodiments of the invention should not be considered limited to the specific number and arrangement of steps shown in FIGS. 2.1 and 2.2.

FIG. 2.1 shows a method of object tracking using a light source attached to the object. Initially, in Step 201, a light source within a scene is activated. In one or more embodiments of the invention, the light source is attached to an object in the scene. In one or more embodiments, the light source emits a strobe light, which changes intensity and/or color from time to time. For example, the strobe light emits a free-running light pattern in response to the light source being activated (e.g., turned on). In one or more embodiments, the light source emits a strobe light with a low repetition rate (e.g., 10 hertz, 20 hertz, etc.) comparing to a frame rate of a camera device. In one or more embodiments, the light source emits a strobe light that is synchronized with the frame rate of the camera device. For example, the strobe light may be initiated and/or synchronized based on a trigger signal sent from a tracking controller and/or the camera device.

In Step 202, a sequence of images of the scene is captured by a camera device. In particular, the object is within the field-of-view (FOV) of the camera lens and appears in the sequence of images. For example, the sequence of images may include or be part of a burst of still images. In another example, the sequence of images may include or be part of a video recording. In one or more embodiments, the sequence of images of the scene is captured while the light source emits the strobe light. In one or more embodiments, the frame rate of the sequence of images is selected based on the duty cycle and/or repetition rate of the light source such that consecutive images (or a pair of images with a particular separation in the sequence) include alternating bright level and dark level, and/or alternating colors from the light source. For example, the light source may be free running and the frame rate is selected based on a pre-determined duty cycle and/or repetition rate of the free running light source. In one or more embodiments, a timer of the camera device is used to control image capture according to the selected frame rate.

In one or more embodiments, the duty cycle and/or repetition rate of the light source is selected based on the frame rate of the sequence of images such that consecutive images (or a pair of images with a particular separation in the sequence) include alternating bright level and dark level, and/or alternating colors from the light source. For example, the frame rate may be pre-determined and the light source is synchronized to the frame rate, e.g., based on a trigger signal from the camera device.

In Step 203, based on a local light change pattern across the sequence of images, the light source is detected in the scene. Specifically, the strobe light emitted from the light source causes changes in light intensity and/or color/wavelength received by an optical sensor of the camera device resulting in the local light change pattern across the sequence of images. In one or more embodiments, the intensity of the strobe light is adjusted to control the size of the location where the local intensity change pattern is found in each image. For example, the location size may be limited to a percentage (e.g., 1%, 3%, etc.) of the horizontal and vertical dimensions of the FOV. In one or more embodiments, the location and the size are defined where the difference in alternating bright level and dark level, and/or alternating colors, in consecutive images, as recognized by the optical sensor of the camera device, exceeds a pre-determined threshold. In one or more embodiments, the location is referred to as the location of the light source in the image.

In one or more embodiments, the light changing pattern of the light source is under interference from the ambient light, e.g., due to outdoor sun light. In such embodiments, the light changing pattern is extracted from the optical sensor output using the method described in reference to FIG. 2.2 below.

In one or more embodiments, a pair of images in the sequence of images are compared by subtraction of intensity and/or color/wavelength values of corresponding pixels. Specifically, the intensity and/or color values are generated by the optical sensor. In particular, the intensity and/or color value of a pixel in one image is subtracted from the intensity and/or color value of the corresponding pixel in another image to generate a subtraction result. The pixel where the difference in alternating bright level and dark level, and/or alternating colors, is found in the subtraction result is selected as part of the location of the light source in the image. Depending on the duty cycle/repetition rate of the light source versus the frame rate of the sequence of images, the pair of images may be consecutive images or two images separated by a particular number of images, such as every three images, etc.

In Step 204, the sequence of images is analyzed to determine a location of the light source in at least one image and a movement of the light source across the sequence of images. In one or more embodiments, the location of the light source is determined based on where the difference in alternating bright level and dark level, and/or alternating colors in the sequence of images, as recognized by the optical sensor of the camera device, exceeds the pre-determined threshold. In one or more embodiments, the movement of the light source is determined based on a rate of change of the location over the sequence of images.

In Step 205, in response to detecting the light source, the location of the light source and a target position within at least one image are compared to generate a result. In one or more embodiments, the result includes the displacement from the location to the target position. In one or more embodiments, the displacement may vary from one image to next in the sequence of images, indicating that the object is a moving object. In such embodiments, the rate of change of the displacement over time, e.g., from one image to next, is computed as a movement parameter.

In Step 206, a control signal is generated based on the result for orienting the camera device. In one or more embodiments, the control signal is configured to adjust the orientation of the camera lens in the opposite direction to the displacement. For example, if the displacement indicates that the target position is to the right of the light source location within the image, the control signal adjusts the orientation of the camera lens toward the left. In one or more embodiments, the control signal is configured to adjust the relative position of the camera with respect to the scene in the opposite direction to the displacement. For example, if the displacement indicates that the target position is to the right of the light source location within the image, the control signal adjusts the relative position of the camera toward the left. In one or more embodiments, the movement parameter is considered in fine tuning the amount of adjustment caused by the control signal.

In Step 207, the control signal is sent to a camera device holder (e.g., a tilt-and-swivel device or a mechanical stage) where the camera device is mounted. Accordingly, the orientation of the camera lens or a relative position of the camera device is adjusted in the opposite direction to the displacement.

In Step 208, a substantial alignment between the target position and the light source is detected within the FOV of the camera device. In particular, the substantial alignment is a result of adjusting the orientation of the camera lens or a relative position of the camera device in the opposite direction to the displacement.

In Step 209, in response to detecting the substantial alignment, an additional image of the scene is captured. In one or more embodiments, consecutive images are continuously captured and outputted by the camera device at a regular repetition rate (i.e., frame rate). In such embodiments, the sequence of images that is analyzed to generate the control signal is limited to a rolling time window (e.g., a rolling sequence of 2 consecutive images, 5 consecutive images, 10 consecutive images, etc.) that precedes the additional image. As time passes, the additional image becomes part of an updated sequence of images for generating an updated control signal to continuously track the object in the FOV.

In one or more embodiments, the sequence of images that is analyzed to generate the control signal is designated as control information without being outputted by the camera device. In contrast, the additional image where the light source (hence the object) substantially aligns with the target position is outputted by the camera device. For example, the control information may be stored separate from the additional image until being discarded or otherwise removed from the camera device.

In Step 210, a determination is made as to whether image capturing is to continue. If the determination is positive, i.e., the image capturing is to continue, the method returns to Step 202. If the determination is negative, i.e., the image capturing is not to continue, the method ends.

FIG. 2.2 shows a method of detecting a light source under ambient light interference. In one or more embodiments, the method described in FIG. 2.2 is used to extract the light changing pattern of the light source under interference from the ambient light, e.g., due to outdoor sun light. For example, the method described in FIG. 2.2 may be included in Step 203 depicted in FIG. 2.1 above.

Initially in Step 211, an image of a scene is captured using an optical sensor having first and second sensing matrices. In one or more embodiments of the invention, the first and second sensing matrices correspond to a portion of an RGB sensor receiving light through a visible band filter. In particular, the visible band filter is selected so as to reduce light transmission in at least one visible band, such as green wavelength range or any other pre-defined visible wavelength range. In cooperation with the visible band filter, the first sensing matrix includes one or more light sensitive channel (e.g., G channel) that is sensitive to the at least one visible band (e.g., green wavelength range). In contrast, the second sensing matrix includes one or more light sensitive channel (e.g., R or B channel) that is insensitive to the at least one visible band. In one or more embodiments, the RGB sensor with all light sensitive channels exhibiting substantially similar sensitivity to the IR band is used for capturing the image.

In one or more embodiments of the invention, the first and second sensing matrices correspond to a visible light sensing matrix and an infrared (IR) sensing matrix of an RGB-IR sensor. For example, the first sensing matrix may include one or more of the R, G, or B channel, while the second sensing matrix may include the IR channel.

In one or more embodiments, the scene includes ambient light interfering with the light source attached to the object. Accordingly, the image includes a tonal characteristics consistent with the ambient light. For example, the tonal characteristics include intensity distribution in a wavelength spectrum of the radiation from the sun.

In Step 212, a first pixel of the image is analyzed to detect imbalanced pixel sensing values from the first and second sensing matrices. In the embodiments using the RGB sensor, the imbalanced pixel sensing values are generated by the RGB sensor in response to illumination from ambient light filtered by the visible band filter to have reduced level in the at least one visible band. In other embodiments using the RGB-IR sensor, the imbalanced pixel sensing values are generated by the RGB-IR sensor in response to illumination from ambient light, the ambient light having a lower level (e.g., by 5% or other pre-determined percentage difference) in an IR band than the at least one visible band.

In step 213, a second pixel of the image is analyzed to detect balanced pixel sensing values from the first and second sensing matrices. In the embodiments using the RGB sensor, the balanced pixel sensing values are generated by the RGB sensor in response to illumination from the light source having a wavelength range separate from the at least one visible band. In particular, the first sensing matrix (e.g., G channel) and second sensing matrix (e.g., R or B channel) have balanced responses (e.g., less than 5% or other pre-determined percentage difference) in the invisible wavelength range, such as the IR range.

In other embodiments using the RGB-IR sensor, the balanced pixel sensing values are generated by the RGB-IR sensor in response to illumination from the light source having an invisible wavelength range. In particular, the first sensing matrix (e.g., R, G, or B channel) and second sensing matrix (e.g., IR channel) have balanced (e.g., less than 5% or other pre-determined percentage difference) responses in the invisible wavelength range, such as the IR range.

In Step 214, the imbalanced pixel sensing values and the balanced pixel sensing values are compared to generate a result. In one or more embodiments, the result includes a first portion of the image where each pixels has imbalanced pixel sensing values, and a second portion of the image where each pixel has balanced pixel sensing values.

In Step 215, the first portion of the image (associated with the imbalanced pixel sensing values such as the first pixel) is determined as corresponding to a background of the scene, and the second portion of the image (associated with the balanced pixel sensing values such as the second pixel) is determined as corresponding to the pre-determined light source.

FIGS. 3.1, 3.2, 3.3, 3.4, 4, 5, and 6 show various examples in accordance with one or more embodiments of the invention. The examples shown in FIGS. 3.1-6 may be, for example, based on one or more components depicted in FIGS. 1.1 and 1.2 above and the method flowcharts depicted in FIGS. 2.1 and 2.2 above. The following description of FIGS. 3.1-6 refers to various components depicted in FIGS. 1.1-1.3 above. In one or more embodiments, one or more of the modules and elements shown in FIGS. 3.1-6 may be omitted, repeated, and/or substituted. Accordingly, embodiments of the invention should not be considered limited to the specific arrangements of modules shown in FIGS. 3.1-6.

FIG. 3.1 shows an example of detecting dual band infrared light source for object tracking. In one example scenario, a dual-channel filter is used to allow the IR wavelength range to pass through, and to allow a certain visible light wavelength range (e.g., green or blue) to pass through. The goal is to separate IR only light source signals from a complex background that has a full spectrum of reflection (including visible light and infrared light).

As shown in FIG. 3.1, the ambient light (143a) may be caused by radiation spectrum of the sun in an outdoor scene. The 940 nanometer (nm) wavelength is chosen for the light source (143) to take advantage of relatively low intensity of sun radiation spectrum at 940 nm. In the sunlight environment, ambient light intensity may be sufficiently high to exceed the detection maximum of the photosensitive elements causing the captured image to become overexposed. Overexposed image is not usable to detect the light source (143) in the scene.

In one example scenario where the optical sensor (113) is an RGB sensor, the optical filter (112) is used that has a dual band transmission profile (320) shown in FIG. 3.2 below. In particular, the horizontal and vertical axes in FIG. 3.2 correspond to wavelength and transmission percentage, respectively, of the optical filter (112). The dual band transmission profile (320) includes band A (112a) and band B (112b) at 530 nm (green light) and 940 nm (IR), respectively. The ambient light (143a) passes through band A (112a) of the optical filter (112) to be captured by the RGB sensor generating imbalanced pixel sensing values (i.e., each pixel has higher G channel sensing value than R and B channels). For example, certain imbalanced pixel sensing values may correspond to tree leaves in the background (144). In contrast, the light source emission (143b) passes through band B (112b) of the optical filter (112) to be captured by the RGB sensor generating balanced pixel sensing values (i.e., each pixel has similar sensing values for R, G, and B channels). Accordingly, the light source (143) and the background (144) are differentiated by the hardware processor (121) to determine the corresponding location of the light source (143) within the image A (126a). This example approach provides a low cost advantage of RGB sensor; however, using the 530 nm green filter, the captured image has green tint and is not usable without post processing.

In another example scenario where the optical sensor (113) is an RGB-IR sensor with sensor profile (321) shown in FIG. 3.2 below, the optical filter (112) is not used. In FIG. 3.2, the horizontal axis corresponds to wavelength while the vertical axis corresponds to sensor sensitivity of each channel of the RGB-IR sensor. In particular, the R channel (321a) is sensitive in the range of red light and IR, G channel (321b) is sensitive in the range of green light and IR, and B channel (321c) is sensitive in the range of blue light and IR. In contrast, IR channel (321d) is only sensitive in the IR range. In particular, while IR, R, G, and B channel generate different levels of sensing values in response to a visible wavelength, IR, R, G, and B channel generate similar levels of sensing values in response to an IR wavelength. Therefore, ambient light (143a) captured by the RGB-IR sensor generates imbalanced pixel sensing values (i.e., each pixel has lower IR channel sensing value than at least one sensing value for R, G, and B channels). For example, certain imbalanced pixel sensing values may correspond to tree leaves in the background (144). In contrast, the light source emission (143b) captured by the RGB-IR sensor generates balanced pixel sensing values (i.e., each pixel has similar sensing values for IR, R, G, and B channels). Accordingly, the light source (143) and the background (144) are differentiated by the hardware processor (121) to determine the corresponding location of the light source (143) within the image A (126a).

FIG. 3.3 shows a motorized camera mobile device stand (210) as an example of the camera device holder (130) depicted in FIG. 1.1 above. In addition, a camera mobile device (201) (e.g., a smart phone having a camera lens (220)), mechanically held by the motorized camera mobile device stand (210), is an example of the camera device (110) depicted in FIG. 1.1 above. In one or more embodiments of the invention, the motorized camera mobile device stand (210) is an electro-mechanical assembly that includes a holder (221), a tilting shaft (203), a bracket (204), a rotating shaft (209), and a stand (222). The holder (221) is configured to mechanically hold the camera mobile device (201) and mechanically couple to the tilting shaft (203). The stand (222) is configured to maintain, while being placed on a solid surface, mechanical stability of the motorized camera mobile device stand (210). Although not explicitly shown, the bracket (204) houses a tilting motor coupled to the tilting shaft (203), a rotating motor coupled to the rotating shaft (209), and a communication interface configured to communicate with the camera device (110) and/or the tracking controller (120) depicted in FIG. 1.1 above. For example, the communication interface may be based on Bluetooth, NFC, USB, or other wireless/wired communication interfaces. In one or more embodiments, the rotating shaft (209) is rotatable around a rotating axis (209-1) by the rotating motor in response to a control signal received from the tracking controller (120) via the communication interface. Similarly, the tilting shaft (203) is rotatable by the tilting motor around a tilting axis (203-1) in response to the control signal received from the tracking controller (120) via the communication interface. In response to tilting the holder (221) around the tilting axis (203-1) and/or rotating the holder (221), collectively with the tilting shaft (203) and the bracket (204), around the rotating axis (209-1), the orientation of the camera lens (220) may be adjusted. Accordingly, the FOV (220-1) of the camera lens (220) is adjusted according to the orientation of the camera lens (220).

FIG. 3.4 shows a camera mobile device handheld grip (800) as an example of the camera device holder (130) depicted in FIG. 1.1 above. In addition, a camera mobile device (201) (e.g., a smart phone having a camera lens (220)), mechanically held by the camera mobile device handheld grip (800), is an example of the camera device (110) depicted in FIG. 1.1 above. In one or more embodiments of the invention, the camera mobile device handheld grip (800) is an electro-mechanical assembly that includes a holder (221), a tilting shaft (203), a tilting motor (213), a rotating shaft (209), a rotating motor (219), and a handheld grip (222). The holder (221) is configured to mechanically hold the camera mobile device (201) and mechanically couple to the tilting shaft (203). The handheld grip (222) is configured to maintain, while being handheld by a viewer, mechanical stability of the camera mobile device handheld grip (800). Although not explicitly shown, the handheld grip (222) includes a communication interface configured to communicate with the camera device (110) and/or the tracking controller (120) depicted in FIG. 1.1 above. For example, the communication interface may be based on Bluetooth, NFC, USB, or other wireless/wired communication interfaces. In one or more embodiments, the rotating shaft (209) is rotatable around a rotating axis (209-1) by the rotating motor (219) in response to a control signal received from the tracking controller (120) via the communication interface. Similarly, the tilting shaft (203) is rotatable by the tilting motor (213) around a tilting axis (203-1) in response to the control signal received from the tracking controller (120) via the communication interface. In response to tilting the holder (221) around the tilting axis (203-1) and/or rotating the holder (221), collectively with the tilting shaft (203) and tilting motor (213), around the rotating axis (209-1), the orientation of the camera lens (220) may be adjusted. Accordingly, the FOV (220-1) of the camera lens (220) is adjusted according to the orientation of the camera lens (220).

FIG. 4 shows an example of the light change pattern (124) of the light source (143) depicted in FIGS. 1.1 and 1.2 above. As shown in FIG. 4, the horizontal axis corresponds to time and the vertical axis corresponds to light intensity. In particular, the light change pattern (124) is a pattern of light intensity (e.g., IR intensity) alternating between a light level (400a) and a dark level (400b) over time. For example, the light level (400a) of the light intensity sustains over a time period A (410) and may be recurring over time with certain repetition rate. While the light intensity alternates between the light level (400a) and the dark level (400b) over time, a sequence of images is captured by a camera device periodically. For example, consecutive images in the sequence may be captured at a time point A (401a), time point B (401b), time point C (401c), etc. that are separate from each other by a time period B (420), time period C (430), etc. In particular, the time period A (410) encompasses at least one image capture time point, such as the time point B (401b). Although the light change pattern (124) depicted in FIG. 4 is a pattern of light intensity changes, the light change pattern (124) may also include color changes (e.g., IR wavelength changes) in other examples. In other words, the light level (400a) and dark level (400b) may be substituted or supplemented by different colors (i.e., wavelength) to represent color changes.

Figure 5:
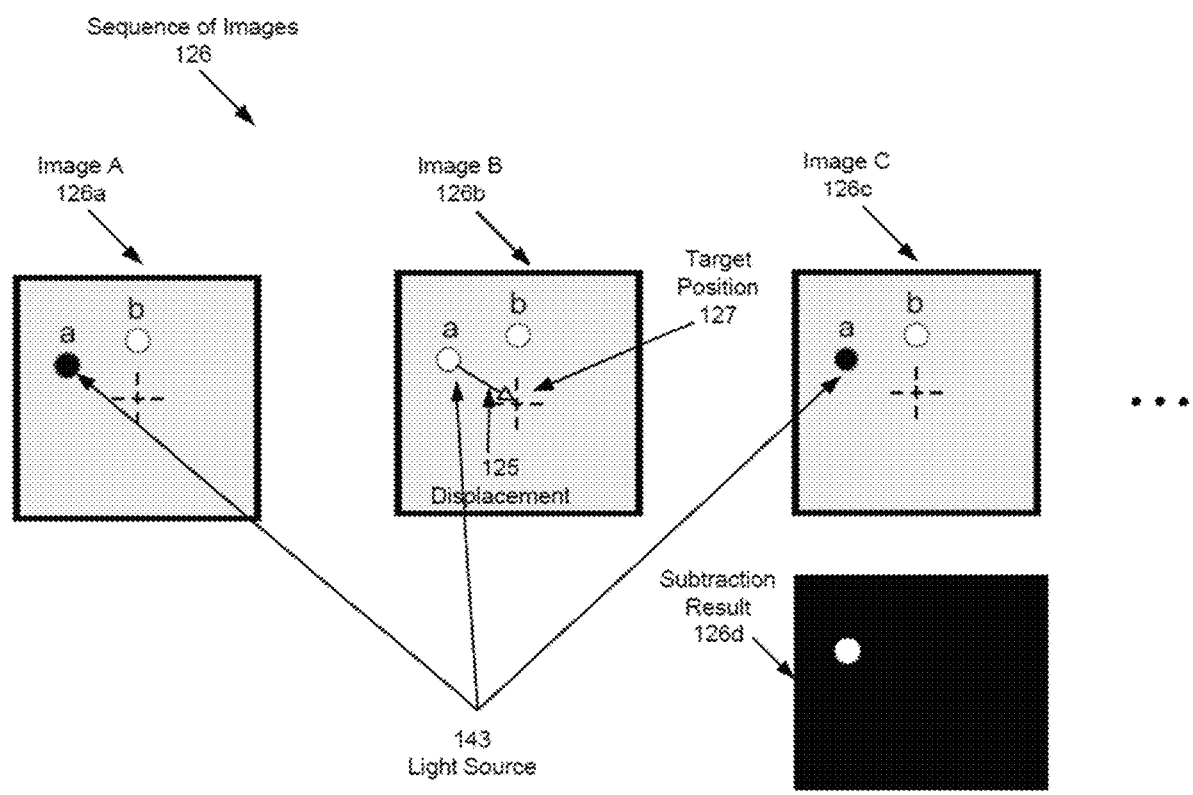

FIG. 5 shows an example of the sequence of images (126) of the scene (140) depicted in FIGS. 1.1 and 1.2 above. As shown in FIG. 5, the sequence of images (126) includes the image A (126a), image B (126b), image C (126c), etc. that are captured at the time point A (401a), time point B (401b), time point C (401c), etc. depicted in FIG. 4 above. According to the example of the light change pattern (124) described in reference to FIG. 4 above, the light source (143) appears as an alternating dark and bright spot at a location marked "a" in the image A (126a), image B (126b), image C (126c), etc. In contrast, the pixel sensing values remain substantially constant at another location marked "b" in the image A (126a), image B (126b), image C (126c), etc. For example, the location marked "a" may be determined by subtracting sensing values of corresponding pixels in the image A (126a) and image B (126b) to generate the subtraction result (126d). Similarly, the location marked "a" may be further determined by subtracting sensing values of corresponding pixels in the image B (126b) and image C (126c) to generate the subtraction result (126d). In the subtraction result (126d), black color indicates no difference and white color indicates a non-zero difference. Accordingly, the location of the light source corresponds to the white spot in the subtraction result (126d).

Further as shown in FIG. 5, the center of each image is defined as the target position (127). Accordingly, the distance from the location marked "a" to the target position (127) corresponds to the displacement (125). The location marked "a", the target position (127), and the displacement (125) shown in FIG. 5 are examples of the location A (127a), target position (127), and displacement (125), respectively, depicted in FIG. 1.2 above. In one or more embodiments, the location marked "a" varies between the image A (126a), image B (126b), image C (126c), etc. The rate of change of the location marked "a" across image A (126a), image B (126b), image C (126c), etc. corresponds to the movement parameter (128) depicted in FIG. 1.2 above.

Figure 6:
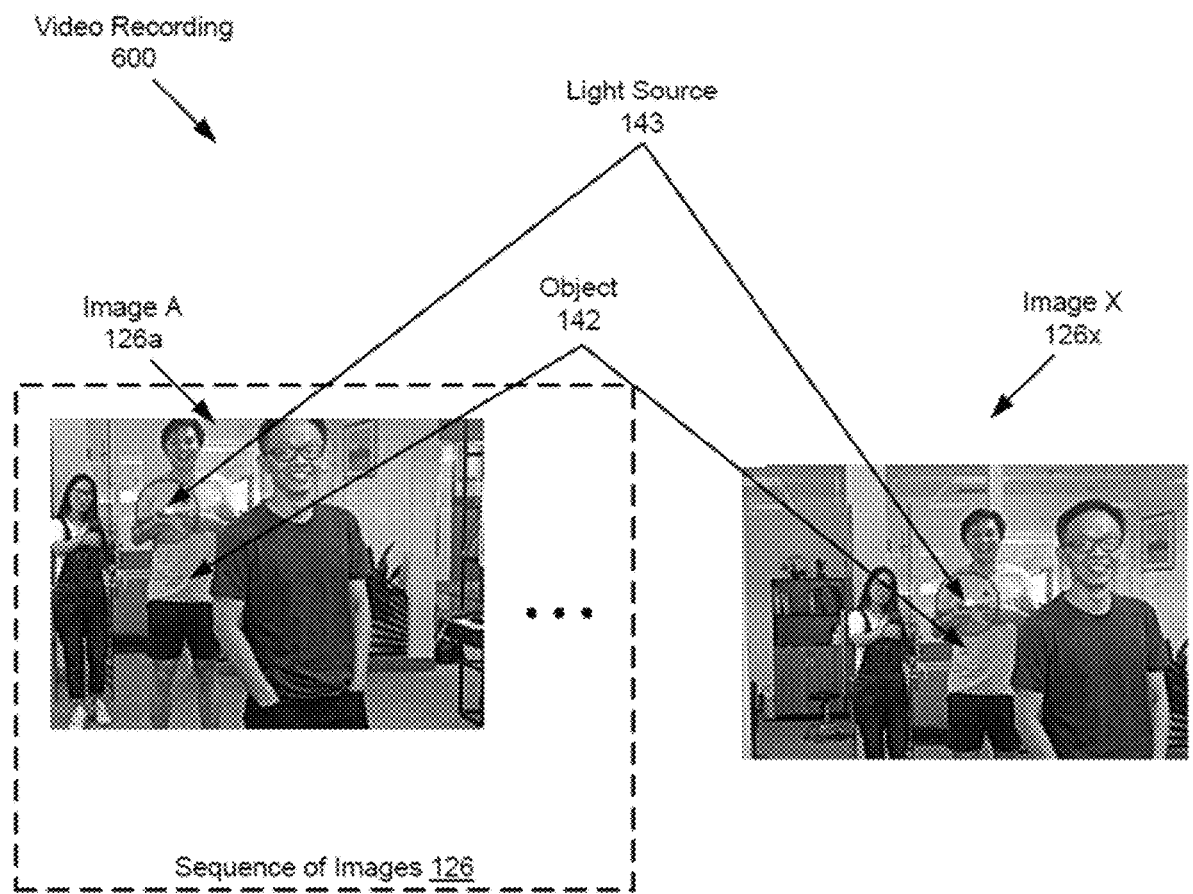

FIG. 6 shows an example video recording (600) that includes the example of the sequence of images (126) described in reference to FIG. 4 above. In an example scenario, the target position is the center of the image. As shown in FIG. 6, the light source (143) is identified at a location in the left portion of the images (e.g., image A (126a)) in the sequence of images (126). In particular, the light source (143) is held by both hands of a male person (i.e., object (142)). For example, the location of the light source (143) is identified based on the alternating dark and bright spot in the image A (126a), image B (126b), image C (126c), etc. depicted in FIG. 5 above. In other words, the light source (143) corresponds to the location marked "a" in the image A (126a), image B (126b), image C (126c), etc. depicted in FIG. 5. Because the target position (i.e., image center) is to the right of the light source location, the object tracking controller (120) is configured to orient the camera device (110) toward the left such that the male person (i.e., object (142)) holding the light source (143) appears in the center of the image. Accordingly, the orientation of the camera device (110) is adjusted based on the identified location "a" of the light source (143) such that the object (142) appears in the center of the image X (126x).

Embodiments of the invention may be implemented on a computing system. Any combination of mobile, desktop, server, router, switch, embedded device, or other types of hardware may be used. For example, as shown in FIG. 7.1, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (700) in FIG. 7.1 may be connected to or be a part of a network. For example, as shown in FIG. 7.2, the network (720) may include multiple nodes (e.g., node X (722), node Y (724)). Each node may correspond to a computing system, such as the computing system shown in FIG. 7.1, or a group of nodes combined may correspond to the computing system shown in FIG. 7.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (700) may be located at a remote location and connected to the other elements over a network.

Although not shown in FIG. 7.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7.1. Further, the client device (726) may include and/or perform all or a portion of one or more embodiments of the invention.

The computing system or group of computing systems described in FIGS. 7.1 and 7.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 7.1 may implement and/or be connected to a data repository. For example, one type of data repository is a database. A database is a collection of information configured for ease of data retrieval, modification, reorganization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 7.1 and the nodes and/or client device in FIG. 7.2. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method, comprising:
capturing, using an optical sensor comprising first and second sensing matrices, an image of a scene;
analyzing a first pixel of the image to detect imbalanced pixel sensing values from the first and second sensing matrices;
analyzing a second pixel of the image to detect balanced pixel sensing values from the first and second sensing matrices;
comparing the imbalanced pixel sensing values and the balanced pixel sensing values to generate a result;
determining, based on the result, that a first portion of the scene associated with the first pixel corresponds to a background of the scene, and that a second portion of the scene associated with the second pixel corresponds to a pre-determined light source;
capturing, using a camera device comprising the optical sensor, a sequence of images comprising the image;
detecting, based on a pattern of local light change across the sequence of images, the pre-determined light source in the scene;
comparing, in response to detecting the pre-determined light source, a location of the pre-determined light source in at least one image of the sequence of images and a target position within the at least one image to generate a result; and
generating, based on the result, a control signal for changing a field-of-view of the camera device such that the pre-determined light source substantially aligns with the target position within the field-of-view.

2. The method of claim 1,
wherein the first and second sensing matrices correspond to a portion of an RGB sensor receiving light through a visible band filter, wherein the visible band filter reduces light transmission in at least one visible band,
wherein the imbalanced pixel sensing values are generated by the RGB sensor in response to illumination, having reduced level in the at least one visible band, from environmental lighting, and
wherein the balanced pixel sensing values are generated by the RGB sensor in response to illumination from the pre-determined light source having a wavelength range separate from the at least one visible band, the first and second sensing matrices having balanced responses in the wavelength range.

3. The method of claim 1,
wherein the first and second sensing matrices correspond to a visible light sensing matrix and an infrared (IR) sensing matrix of an RGB-IR sensor,
wherein the imbalanced pixel sensing values are generated by the RGB-IR sensor in response to illumination from environmental lighting, the environmental lighting having a lower level in an IR band than at least one visible band, and
wherein the balanced pixel sensing values are generated by the RGB-IR sensor in response to illumination from the pre-determined light source in combination with the environmental lighting, the IR band of the pre-determined light source and the at least one visible band of the environmental lighting having substantially same levels.

4. The method of claim 3,
wherein the image comprises a tonal characteristics consistent with the environmental lighting, and
wherein the pre-determined light source is invisible in the image.

5. The method of claim 1, further comprising:
sending the control signal to a tilt-and-swivel device where the camera device is mounted;
detecting, in response to sending the control signal, a substantial alignment between the target position and the pre-determined light source within the field-of-view; and
further capturing, using the camera device and in response to detecting the substantial alignment, an additional image of the scene,
wherein the pre-determined light source is attached to an object in the scene such that the object appears in the additional image at the target position.

6. The method of claim 1,
wherein the pattern of local light change across the sequence of images is produced by a strobe light emitted from the pre-determined light source.

7. The method of claim 1,
wherein the balanced pixel sensing values comprise two or more pixel sensing values that differ by less than a pre-determined threshold, and
wherein the imbalanced pixel sensing values comprise two or more pixel sensing values that differ by more than a pre-determined threshold.

8. A tracking controller, comprising:
a computer processor; and
memory storing instructions, when executed, causing the computer processor to:
  obtain, from an optical sensor comprising first and second sensing matrices, an image of a scene;
  analyze a first pixel of the image to detect imbalanced pixel sensing values from the first and second sensing matrices;
  analyze a second pixel of the image to detect balanced pixel sensing values from the first and second sensing matrices;
  compare the imbalanced pixel sensing values and the balanced pixel sensing values to generate a result;
  determine, based on the result, that a first portion of the scene associated with the first pixel corresponds to a background of the scene, and that a second portion of the scene associated with the second pixel corresponds to a pre-determined light source;
  obtain, from a camera device comprising the optical sensor, a sequence of images comprising the image;
  detect, based on a pattern of local light change across a sequence of images, a light source in the scene;
  compare, in response to detecting the light source, a location of the light source in at least one image of the sequence of images and a target position within the at least one image to generate a result; and
  generate, based on the result, a control signal for changing a field-of-view of the camera device such that the light source substantially aligns with the target position within the field-of-view.

9. The tracking controller of claim 8,
wherein the first and second sensing matrices correspond to a portion of an RGB sensor receiving light through a visible band filter, wherein the visible band filter reduces light transmission in at least one visible band,
wherein the imbalanced pixel sensing values are generated by the RGB sensor in response to illumination, having reduced level in the at least one visible band, from environmental lighting, and
wherein the balanced pixel sensing values are generated by the RGB sensor in response to illumination from the pre-determined light source having a wavelength range separate from the at least one visible band, the first and second sensing matrices having balanced responses in the wavelength range.

10. The tracking controller of claim 8,
wherein the first and second sensing matrices correspond to a visible light sensing matrix and an infrared (IR) sensing matrix of an RGB-IR sensor,
wherein the imbalanced pixel sensing values are generated by the RGB-IR sensor in response to illumination from environmental lighting, the environmental lighting having a lower level in an IR band than at least one visible band, and
wherein the balanced pixel sensing values are generated by the RGB-IR sensor in response to illumination from the pre-determined light source in combination with the environmental lighting, the IR band of the pre-determined light source and the at least one visible band of the environmental lighting having substantially same levels.

11. The tracking controller of claim 10,
wherein the image comprises a tonal characteristics consistent with the environmental lighting, and
wherein the pre-determined light source is invisible in the image.

12. The tracking controller of claim 8, the instructions, when executed, further causing the computer processor to:
  send the control signal to a tilt-and-swivel device where the camera device is mounted;
  detect a substantial alignment between the target position and the light source within the field-of-view; and
  cause the camera device to further capture, in response to detecting the substantial alignment, an additional image of the scene,
  wherein the light source is attached to an object in the scene such that the object appears in the additional image at the target position.

13. The tracking controller of claim 8,
wherein the pattern of local light change across the sequence of images is produced by a strobe light emitted from the light source.

14. The tracking controller of claim 8,
wherein the balanced pixel sensing values comprise two or more pixel sensing values that differ by less than a pre-determined threshold, and
wherein the imbalanced pixel sensing values comprise two or more pixel sensing values that differ by more than a pre-determined threshold.

15. A non-transitory computer readable medium storing instructions for object tracking, the instructions, when executed by a computer processor, comprising functionality for:
  obtaining, from an optical sensor comprising first and second sensing matrices, an image of a scene;
  analyzing a first pixel of the image to detect imbalanced pixel sensing values from the first and second sensing matrices;
  analyzing a second pixel of the image to detect balanced pixel sensing values from the first and second sensing matrices;
  comparing the imbalanced pixel sensing values and the balanced pixel sensing values to generate a result;
  determining, based on the result, that a first portion of the scene associated with the first pixel corresponds to a background of the scene, and that a second portion of the scene associated with the second pixel corresponds to a pre-determined light source;
  obtaining, from a camera device comprising the optical sensor, a sequence of images comprising the image;
  detecting, based on a pattern of local light change across the sequence of images, a light source in the scene;
  comparing, in response to detecting the light source, a location of the light source in at least one image of the sequence of images and a target position within the at least one image to generate a result; and
  generating, based on the result, a control signal for changing a field-of-view of the camera device such that the light source substantially aligns with the target position within the field-of-view.

16. The non-transitory computer readable medium of claim 15, the instructions,
- wherein the first and second sensing matrices correspond to a portion of an RGB sensor receiving light through a visible band filter, wherein the visible band filter reduces light transmission in at least one visible band,
- wherein the imbalanced pixel sensing values are generated by the RGB sensor in response to illumination, having reduced level in the at least one visible band, from environmental lighting, and
- wherein the balanced pixel sensing values are generated by the RGB sensor in response to illumination from the pre-determined light source having a wavelength range separate from the at least one visible band, the first and second sensing matrices having balanced responses in the wavelength range.

17. The non-transitory computer readable medium of claim 15,
- wherein the first and second sensing matrices correspond to a visible light sensing matrix and an infrared (IR) sensing matrix of an RGB-IR sensor,
- wherein the imbalanced pixel sensing values are generated by the RGB-IR sensor in response to illumination from environmental lighting, the environmental lighting having a lower level in an IR band than at least one visible band, and
- wherein the balanced pixel sensing values are generated by the RGB-IR sensor in response to illumination from the pre-determined light source in combination with the environmental lighting, the IR band of the pre-determined light source and the at least one visible band of the environmental lighting having substantially same levels.

18. The non-transitory computer readable medium of claim 17,
- wherein the image comprises a tonal characteristics consistent with the environmental lighting, and
- wherein the pre-determined light source is invisible in the image.

19. The non-transitory computer readable medium of claim 15, the instructions, when executed by the computer processor, further comprising functionality for:
- sending the control signal to a tilt-and-swivel device where the camera device is mounted;
- detecting, in response to sending the control signal, a substantial alignment between the target position and the light source within the field-of-view; and
- further capturing, using the camera device and in response to detecting the substantial alignment, an additional image of the scene,
- wherein the light source is attached to an object in the scene such that the object appears in the additional image at the target position,
- wherein the pattern of local light change across the sequence of images is produced by a strobe light emitted from the light source.

20. The non-transitory computer readable medium of claim 15,
- wherein the balanced pixel sensing values comprise two or more pixel sensing values that differ by less than a pre-determined threshold, and
- wherein the imbalanced pixel sensing values comprise two or more pixel sensing values that differ by more than a pre-determined threshold.

* * * * *